US012710178B2

(12) United States Patent
Yantis et al.

(10) Patent No.: US 12,710,178 B2
(45) Date of Patent: Aug. 18, 2026

(54) BUMPER FOR A DOOR OF AN OVEN APPLIANCE

(71) Applicant: Haier US Appliance Solutions, Inc., Wilmington, DE (US)

(72) Inventors: John Adam Yantis, Prospect, KY (US); Joshua Mayne, Charlestown, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 297 days.

(21) Appl. No.: 18/480,244

(22) Filed: Oct. 3, 2023

(65) Prior Publication Data

US 2025/0109860 A1 Apr. 3, 2025

(51) Int. Cl.
*F24C 15/02* (2006.01)
*E05F 5/02* (2006.01)

(52) U.S. Cl.
CPC ................ *F24C 15/02* (2013.01); *E05F 5/02* (2013.01)

(58) Field of Classification Search
CPC .. F24C 15/02; F24C 15/08; E05F 5/02; E05Y 2600/53; E05Y 2800/292; E05Y 2800/678; E05Y 2900/308
See application file for complete search history.

(56) References Cited

U.S. PATENT DOCUMENTS

| | | | | | |
|---|---|---|---|---|---|
| 3,846,608 | A * | 11/1974 | Valles | H05B 6/763 277/653 |
| 4,172,769 | A * | 10/1979 | Becker, Jr. | C10B 25/16 202/269 |
| 4,538,381 | A * | 9/1985 | Vogel | F24C 15/021 49/492.1 |
| 4,991,352 | A * | 2/1991 | Hyer | F24C 15/021 49/489.1 |
| 11,946,309 | B2 * | 4/2024 | Gore | F24C 15/027 |
| 2023/0243512 | A1 * | 8/2023 | Farrel | F24C 15/024 126/19 R |

FOREIGN PATENT DOCUMENTS

| | | | | | |
|---|---|---|---|---|---|
| CN | 203835120 | U | 9/2014 | |
| CN | 109497839 | B * | 5/2021 | A47J 36/00 |
| CN | 111520775 | B | 4/2022 | |
| EP | 0857918 | B1 | 10/2002 | |
| KR | 200148711 | Y1 | 6/1999 | |
| KR | 20060091855 | A * | 8/2006 | F24C 7/06 |
| KR | 100700770 | B1 | 3/2007 | |
| KR | 101158580 | B1 | 6/2012 | |

* cited by examiner

*Primary Examiner* — Jesse S Bogue
(74) *Attorney, Agent, or Firm* — Dority & Manning, P.A.

(57) ABSTRACT

An oven appliance includes a cabinet forming a cooking chamber; at least one heating element positioned within the cooking chamber; a door rotatably coupled to the cabinet between an open position and a closed position; and a bumper protruding along the transverse direction and positioned between the cabinet and the door, the bumper configured to provide dampening between the cabinet and the door in the closed position, wherein the bumper includes a first heat face and a second heat face to guide heated air along the lateral direction, and wherein each of the first heat face and the second heat face is linear.

18 Claims, 7 Drawing Sheets

BUMPER FOR A DOOR OF AN OVEN APPLIANCE

FIELD OF THE INVENTION

The present subject matter relates generally to domestic appliances, and more particularly to shaped bumpers for dampening door closures on domestic appliances.

BACKGROUND OF THE INVENTION

Some domestic appliances (such as oven appliances, for example) include a cabinet defining a cavity or chamber therein. In many cases, a door is included which opens and closes to provide selective access to the cavity. In such cases, certain features are included to dampen the closing of the door with respect to the cabinet. Moreover, in the case of cooking appliances such as ovens, heat produced within the cavity may escape the cavity and flow along a gap produced between the door and the cabinet. Such heat production can cause damage, such as to features of the appliance or surrounding items (e.g., cabinetry).

Current appliances incorporate traditional dampening means. Additionally, current appliances utilize different forms of heat dissipation, such as blowers and heat resistant materials. However, these current forms have certain drawbacks. For instance, blower motors can be loud, expensive, and large, occupying large usable spaces. Moreover, heat resistant materials can be very costly and require reapplication. Further still, heat may collect at sensitive areas unreachable by the air produced by the blower.

Accordingly, a cooking appliance which obviates one or more of the above-mentioned drawbacks would be beneficial. In particular, a cooking appliance with improved means of heat dissipation would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an oven appliance is provided. The oven appliance may include a cabinet forming a cooking chamber; at least one heating element positioned within the cooking chamber; a door rotatably coupled to the cabinet between an open position and a closed position; and a bumper protruding along the transverse direction and positioned between the cabinet and the door, the bumper configured to provide dampening between the cabinet and the door in the closed position, wherein the bumper includes a first heat face and a second heat face to guide heated air along the lateral direction, and wherein each of the first heat face and the second heat face is linear.

In another exemplary aspect of the present disclosure, a domestic appliance is provided. The domestic appliance may include a cabinet forming a receiving chamber; a door rotatably coupled to the receiving cabinet to provide selective access to the receiving chamber; and a resilient bumper protruding along the transverse direction and positioned between the cabinet and the door, the bumper configured to provide dampening between the cabinet and the door when the door is moved to a closed position, wherein the bumper comprises a first face and a second face to guide air along the lateral direction, and wherein each of the first face and the second face is linear.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
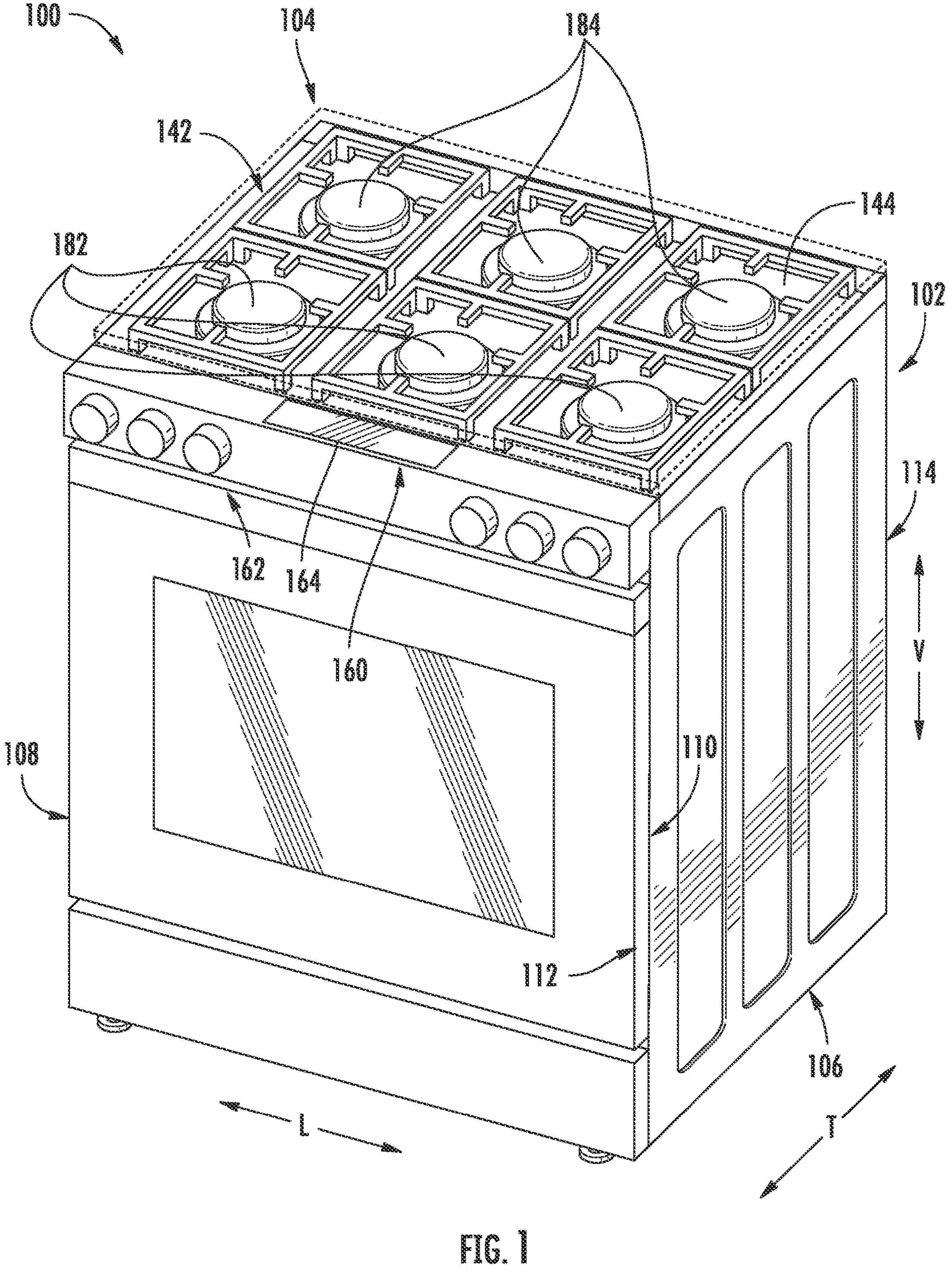
FIG. 1 provides a perspective view of a cooking appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a cooking appliance 100 as may be employed with the present subject matter. Cooking appliance 100 generally defines a vertical direction V, a lateral direction L, and a transverse direction T, each of which is mutually perpendicular, such that an orthogonal coordinate system is generally defined. As illustrated, cooking appliance 100 includes an insulated cabinet 102. Cabinet 102 of cooking appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a single cooking chamber 120 which is configured for the receipt of one or more food items to be cooked. However, it should be appreciated that cooking appliance 100 is provided by way of example only, and aspects of the present subject matter may be used in any suitable cooking appliance, such as a stand-alone cooktop appliance. Thus, the example embodiment shown in FIG. 1 is not intended to limit the present subject matter to any particular cooking chamber configuration or arrangement. Indeed, aspects of the present subject matter may be applied to door assemblies for any suitable domestic appliance.

Cooking appliance 100 includes a door 124 rotatably attached to cabinet 102 (e.g., between an open position and a closed position) in order to permit selective access to cooking chamber 120. Handle 126 is mounted to door 124 to assist a user with opening and closing door 124 in order to access cooking chamber 120. As an example, a user can pull on handle 126 mounted to door 124 to open or close door 124 and access cooking chamber 120. One or more transparent viewing windows 128 (FIG. 1) may be defined within door 124 to provide for viewing the contents of cooking chamber 120 when door 124 is closed and also assist with insulating cooking chamber 120.

Figure 2:
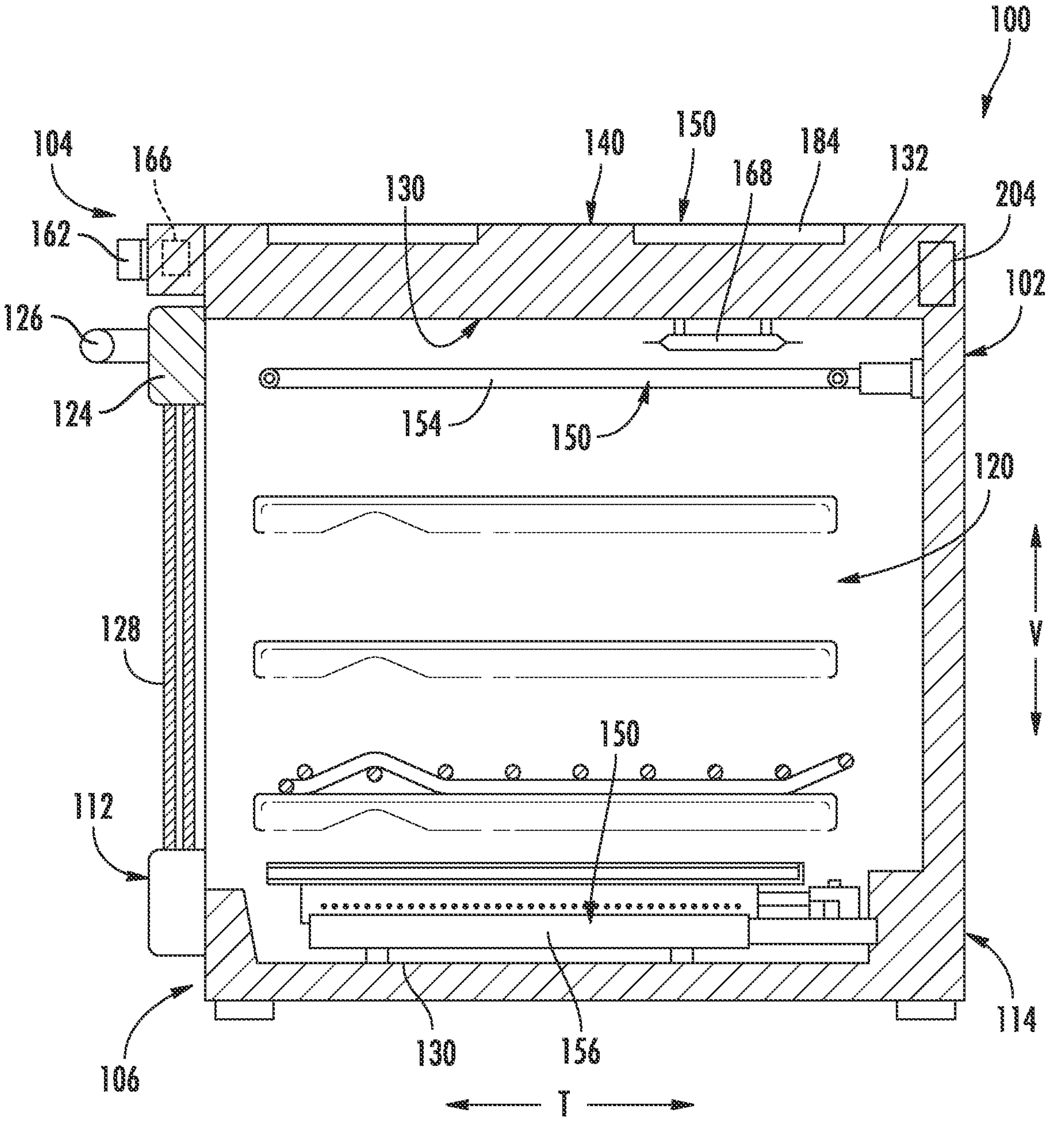
FIG. 2 provides a side section view of the exemplary cooking appliance of FIG. 1.

In general, cooking chamber 120 is defined by a plurality of chamber walls 130 (FIG. 2). Specifically, cooking chamber 120 may be defined by a top wall, a rear wall, a bottom wall, and two sidewalls 130. These chamber walls 130 may be joined together to define an opening through which a user may selectively access cooking chamber 120 by opening door 124. In order to insulate cooking chamber 120, cooking appliance 100 includes an insulating gap defined between the chamber walls 130 and cabinet 102. According to an exemplary embodiment, the insulation gap is filled with an insulating material 132, such as insulating foam or fiberglass, for insulating cooking chamber 120.

Cooking appliance 100 may also include a cooktop 140. Cooktop 140 may be positioned at or adjacent top 104 of cabinet 102 such that it is positioned above cooking chamber 120. Specifically, cooktop 140 may include a top panel 142 positioned proximate top 104 of cabinet 102. By way of example, top panel 142 may be constructed of glass, ceramics, enameled steel, and combinations thereof. One or more grates 144 may be supported on a top surface of top panel 142 for supporting cooking utensils, such as pots or pans, during a cooking process.

Cooking appliance 100 may further include one or more heating elements (identified generally by reference numeral 150 in FIG. 2) for selectively heating cooking utensils or food items positioned within cooking chamber 120. Specifically, an upper gas heating element 154 (also referred to as a broil heating element or gas burner) may be positioned in cabinet 102, e.g., at a top portion of cooking chamber 120, and a lower gas heating element 156 (also referred to as a bake heating element or gas burner) may be positioned at a bottom portion of cooking chamber 120. Upper gas heating element 154 and lower gas heating element 156 may be used independently or simultaneously to heat cooking chamber 120, perform a baking or broil operation, perform a cleaning cycle, etc. The size and heat output of gas heating elements 154, 156 can be selected based on the, e.g., the size of cooking appliance 100 or the desired heat output. Cooking appliance 100 may include any other suitable number, type, and configuration of heating elements 150 within cabinet 102 and/or on cooktop 140. For example, cooking appliance 100 may further include electric heating elements, induction heating elements, or any other suitable heat generating device.

A user interface panel 160 may be located within convenient reach of a user of the cooking appliance 100. For this example embodiment, user interface panel 160 includes knobs 162 that are each associated with one of heating elements 150. In this manner, knobs 162 allow the user to activate each heating element 150 and determine the amount of heat input provided by each heating element 150 to cooking food items within cooking chamber 120 or on cooktop 140. Although shown with knobs 162, it should be understood that knobs 162 and the configuration of cooking appliance 100 shown in FIG. 1 is provided by way of example only. More specifically, user interface panel 160 may include various input components, such as one or more of a variety of touch-type controls, electrical, mechanical or electro-mechanical input devices including rotary dials, push buttons, and touch pads. User interface panel 160 may also be provided with one or more graphical display devices or display components 164, such as a digital or analog display device designed to provide operational feedback or other information to the user such as e.g., whether a particular heating element 150 is activated and/or the rate at which the heating element 150 is set.

Generally, cooking appliance 100 may include a controller 166 in operative communication with user interface panel 160. User interface panel 160 of cooking appliance 100 may be in communication with controller 166 via, for example, one or more signal lines or shared communication busses, and signals generated in controller 166 operate cooking appliance 100 in response to user input via user input devices 162. Input/Output ("I/O") signals may be routed between controller 166 and various operational components of cooking appliance 100 such that operation of cooking appliance 100 can be regulated by controller 166. In addition, controller 166 may also be in communication with one or more sensors, such as temperature sensor 168 (FIG. 2), which may be used to measure temperature inside cooking chamber 120 and provide such measurements to the controller 166. Although temperature sensor 168 is illustrated at a top and rear of cooking chamber 120, it should be appreciated that other sensor types, positions, and configurations may be used according to alternative embodiments.

Controller 166 is a "processing device" or "controller" and may be embodied as described herein. Controller 166 may include a memory and one or more microprocessors, microcontrollers, application-specific integrated circuits (ASICS), CPUs or the like, such as general or special purpose microprocessors operable to execute programming instructions or micro-control code associated with operation of cooking appliance 100, and controller 166 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Cooktop 140 may include a plurality of heating elements (or burners), including a first burner 182 and a second burner 184. First burner 182 may be provided at or near front 112 of cabinet 102 (or a front of cooktop 140). Thus, second burner 184 may be provided at or near rear 114 of cabinet 102 (or a rear of cooktop 140). Additionally or alternatively, first burner 182 may include a plurality of front burners (as shown in FIG. 1). Likewise, second burner 184 may include a plurality of rear burners. It should be understood that any number of first burners 182 and second burners 184 may be provided and the disclosure is not limited to the examples given herein. Additionally or alternatively, first burners 182 and second burners 184 may be any suitable style of burner or heating element, such as gas burners, conduction elements, induction elements, griddles, or the like.

Cooktop 140 (or cooking appliance 100) may include a plurality of knobs (or control knobs) 162. The plurality of knobs 162 may respectively be linked to or control the plurality of burners 150 (e.g., with or through controller 166). For example, the plurality of knobs 162 includes a first control knob to control first burner 182 and a second control knob to control second burner 184. Similar to the burners, first control knob 192 may include a plurality of front control knobs. Accordingly, second control knob 194 may include a plurality of rear control knobs.

Cooking appliance 100 may include a cooling system. The cooling system may include a cooling duct that generally extends between (and provides fluid communication between) user interface panel 160 and an ambient atmosphere outside of cooking appliance 100 (e.g., at rear 114 of cabinet 102). Cooking appliance 100 may further include an air handler 204 that is attached to or in fluid communication with the cooling duct. During use, air handler 204 may facilitate a cooling or air supply process of user interface panel 160 (e.g., display 164). For example, air handler 204 may selectively urge a flow of air through the cooling duct to display 164. It should be appreciated that according to alternative embodiments, air handler 204 may be positioned at any other suitable location and may be any suitable fan type, such as a tangential fan, a centrifugal fan, etc. Air handler 204 may be operably connected with controller 166. For instance, air handler 204 may be selectively operated according to an input received from controller 166 according to air requirements, as will be explained below.

As shown in FIG. 2, air handler 204 may be provided proximate second burner 184. In detail, air handler 204 may be located at or near rear 114 of cabinet 102 (e.g., closer to rear 114 than to front 112 relative to the transverse direction T). Further, air handler 204 may be positioned at or near a lateral center of cabinet 102. Additionally or alternatively, the cooling duct may be positioned beneath cooktop 140 (e.g., along the vertical direction V). Accordingly, air (cooling air) may be supplied from rear 114 of cabinet 102 along the transverse direction T towards front 112 of cabinet 102.

Referring now to FIGS. 3 through 12, cooking appliance 100 may include a bumper 210. Bumper 210 may be positioned between cabinet 102 and door 124. For instance, bumper 210 may protrude along the transverse direction T between cabinet 102 and door 124. Bumper 210 may provide dampening or damping between door 124 and cabinet 102 (e.g., when door 124 is moved to the closed position). Thus, damper 210 may be a resilient bumper. For instance, bumper 210 may be a resilient bumper 210 configured to absorb shock when door 124 is closed. According to at least some embodiments, bumper 210 is formed from rubber. However, it should be understood that the composition of bumper 210 is provided by way of example only and that any suitable resilient or elastic material may be used to form bumper 210.

As shown, a pair of bumpers 210 may be incorporated in cooking appliance 100. For instance, a first bumper 2101 may be provided at a first lateral side of cooking chamber 120 and a second bumper 2102 may be provided at a second lateral side of cooking chamber 120. It should be noted that any suitable number of bumpers 210 may be included, such as four bumpers, six bumpers, or the like. Additionally or alternatively, as will be explained in further detail below, one or more bumpers 210 may be attached to door 124. For instance, a first bumper 210 may be attached to cabinet 102 and a second bumper 210 may be attached to door 124. In still further embodiments, one or more bumpers 210 are attached to door 124 while no bumpers 210 are attached to cabinet 102.

Figure 3:
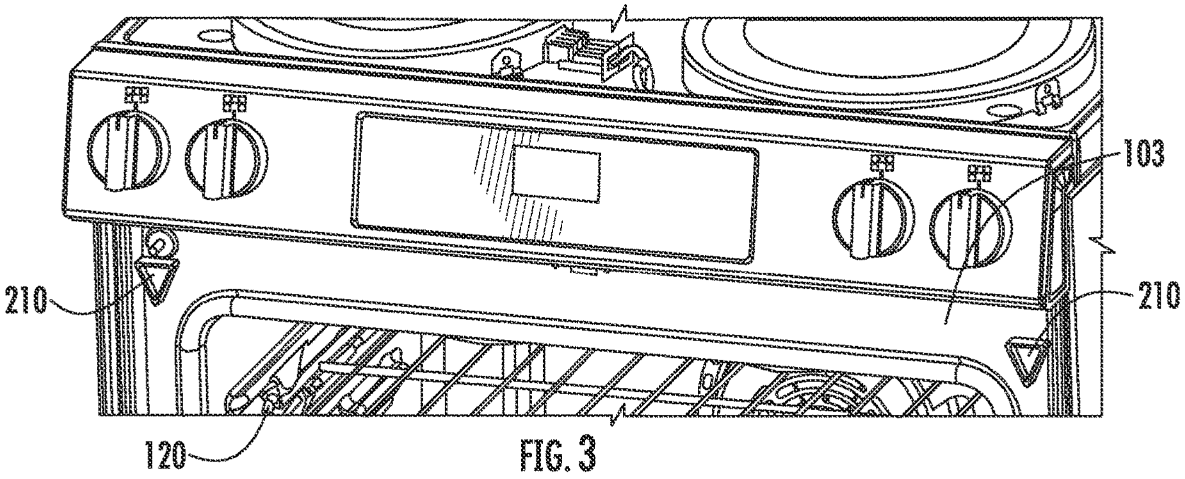
FIG. 3 provides a closeup perspective view of the exemplary cooking appliance of FIG. 1 with a door in an open position.
Figure 4:
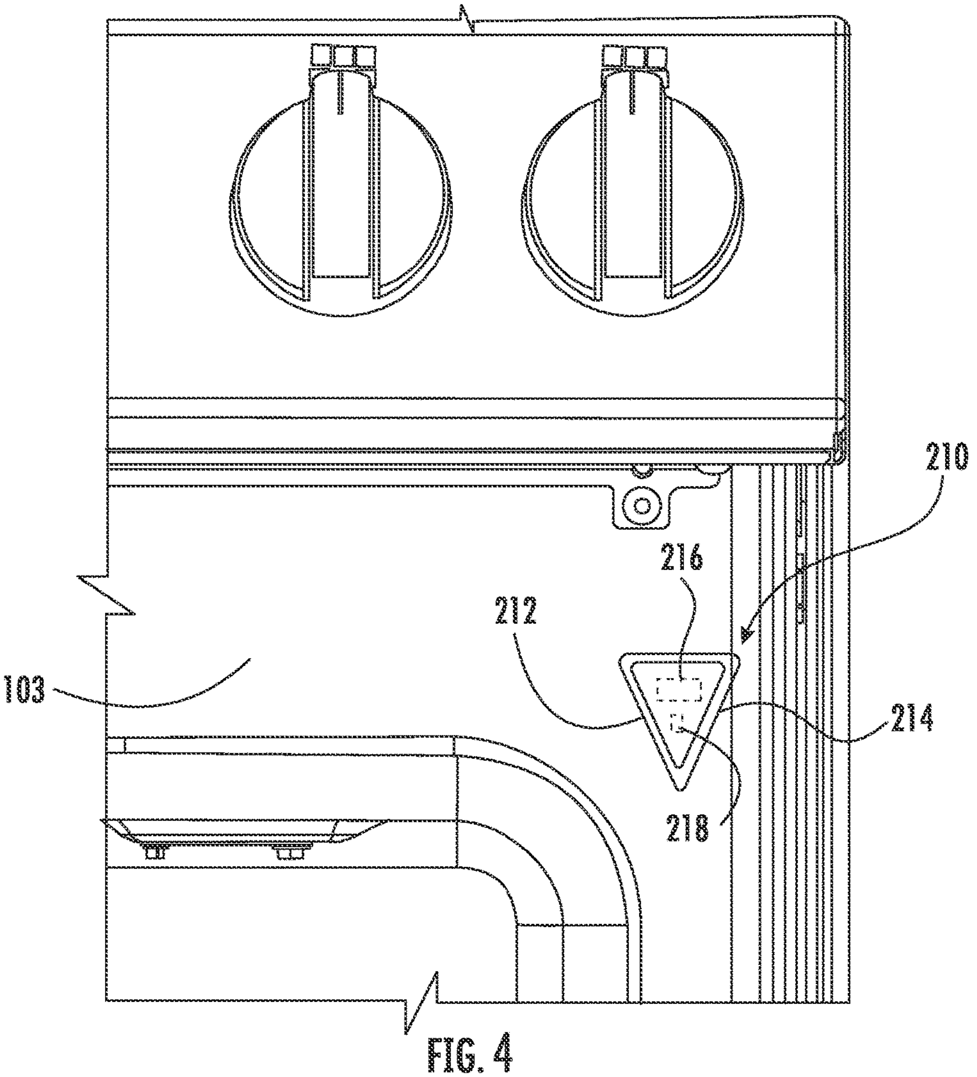
FIG. 4 provides a closeup front view of a bumper according to exemplary embodiments of the present disclosure.

Referring now to FIGS. 3 and 4 in particular, a bumper 210 according to an embodiment is shown. Bumper 210 may have a particular geometric shape. For instance, as shown, bumper 210 may have a generally triangular shape. As mentioned above, bumper 210 may protrude generally along the transverse direction T. Thus, bumper 210 may have a thickness D1 in the transverse direction T. Accordingly, the triangular shape may be defined along the vertical direction V and the lateral direction L. For instance, bumper 210 may define a first face (or first heat face) 212 and a second face (or second heat face) 214. Each of first heat face 212 and second heat face 214 may be linear (e.g., straight). Moreover, first heat face 212 and second heat face 214 may be conjoined. For instance, a conjunction of first heat face 212 and second heat face 214 may form a bottom (e.g., along the vertical direction V) of bumper 210.

As mentioned, bumper 210 may be positioned at or near a top of cooking chamber 120. During cooking operations, heat or heated air may escape laterally from cooking chamber 120. The heat or heated air may then rise along the vertical direction V (e.g., between door 124 and cabinet 102). The heat or heated air may then contact bumper 210. In particular, the heat or heated air may contact first heat face 212 and/or second heat face 214. Upon contacting first heat face 212 and/or second heat face 214, the heat or heated air may be directed along the lateral direction L. Advantageously, the heat or heated air may be dispersed or directed away from sensitive areas (e.g., such as controls, adjacent cabinets, or the like).

Bumper 210 may be positioned above (e.g., along the vertical direction V) and outward (e.g., along the lateral direction L) from cooking chamber 120. In detail, cabinet 102 may include a front face 103. As mentioned above, the plurality of chamber walls 130 may be spaced apart from cabinet 102 (e.g., forming the insulation gap). Front face 103 may enclose the insulation gap along the transverse direction T. Thus, front face 103 may face a front of appliance 100 along the transverse direction T and define a perimeter around cooking chamber 120. Accordingly, bumper 210 may be fixed to front face 103 above and laterally outward from cooking chamber 120. Advantageously, the heat or heated air directed by first heat face 212 or second heat face 214 may be directed laterally above cooking chamber 120.

Cabinet 102 may include an attachment aperture 216. In detail, attachment aperture 216 may be formed in or through front face 103 (e.g., along the transverse direction T). Attachment aperture 216 may thus be a hole formed through front face 103 through which an attachment portion 215 (FIG. 5) of bumper 210 is fed to attach bumper 210 thereto. According to some embodiments, attachment aperture 216 includes one or more clocking features or clocking patterns. For instance, attachment aperture 216 may be shaped with one or more linear portions. Accordingly, when attachment portion 215 of bumper 210 is inserted into attachment aperture 216, bumper 210 is restricted from rotating (e.g., normal to front face 103). As would be understood, attachment portion 215 of bumper 210 may have a matching or complementary design to attachment aperture 216 in order to secure bumper 210 thereto (e.g., with respect to rotation). Attachment portion 215 may protrude from a rear surface of bumper 210. Attachment portion 215 may be made from the same material as bumper 210 (e.g., a resilient or elastic material).

Figure 5:
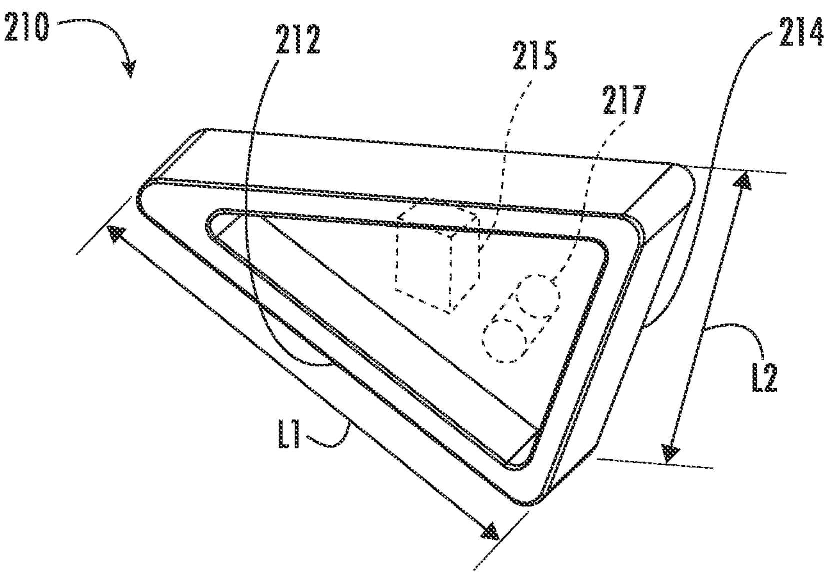
FIG. 5 provides a closeup perspective view of a bumper according to exemplary embodiments of the present disclosure.

Cabinet 102 may include an alignment aperture 218. For instance, alignment aperture 218 may be formed in or through front face 103 (e.g., along the transverse direction T similarly to attachment aperture 216). Alignment aperture 218 may thus be a hole formed through front face 103. Bumper 210 may include an alignment tab 217 (FIG. 5). Alignment tab 217 may have a matching or complementary design to alignment aperture 218. Thus, when bumper 212 is installed or attached to cabinet 102 (e.g., to front face 103), alignment tab 217 may be received within alignment aperture 218 while attachment portion 215 is received within attachment aperture 216 to restrict rotation of bumper 212 with respect to front face 103. Alignment tab 217 and alignment aperture 218 may be provided in addition to or alternatively from the clocking features or clocking patterns. Alignment tab 217 may protrude from a rear surface of bumper 210 (e.g., adjacent to and parallel with attachment portion 215). Alignment tab 217 may be made from the same material as bumper 210 (e.g., a resilient or elastic material).

Figure 6:
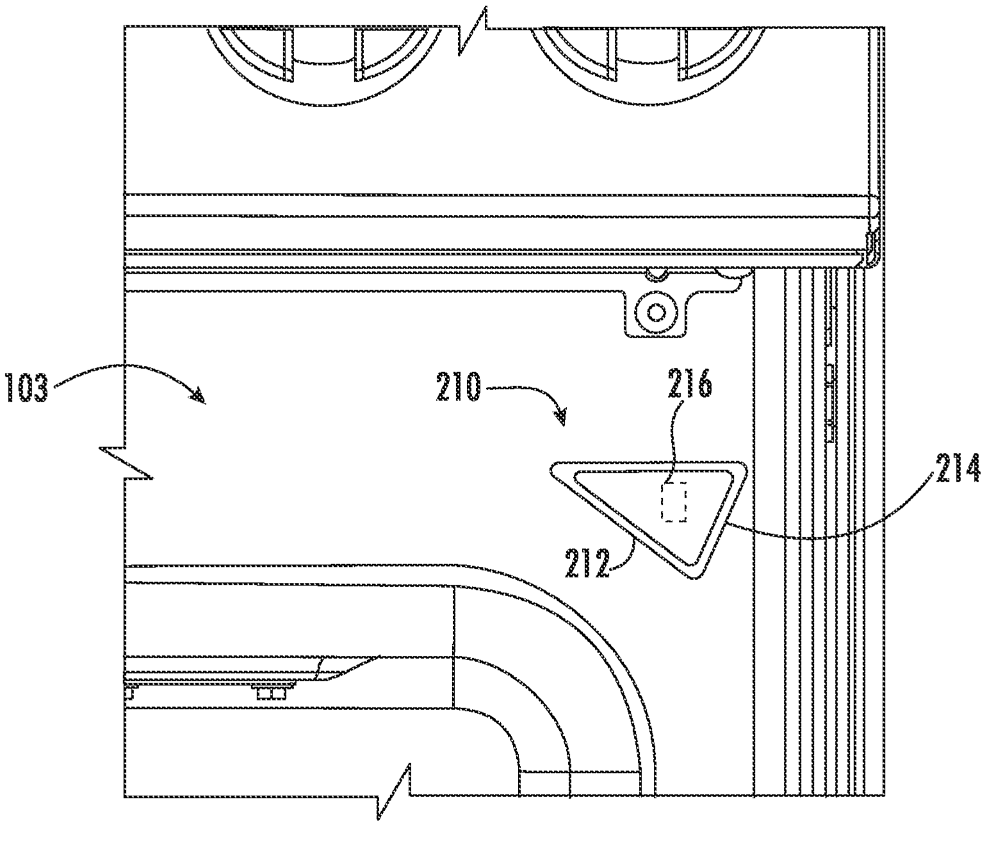
FIG. 6 provides a closeup front view of the exemplary bumper of FIG. 5.

Referring now to FIGS. 5 and 6, another embodiment of bumper 210 is provided. As shown, bumper 210 may include first heat face 212 and second heat face 214. First heat face 212 may have a first length L1 while second heat face 214 may have a second length L2. First length L1 may be longer than second length L2. Additionally or alternatively, first heat face 212 may be directed toward cooking chamber 120. Second heat face 214 may thus be directed away from cooking chamber 120. Accordingly, bumper 212 may define an asymmetrical shape (e.g., about the vertical direction V). As first heat face 212 may be longer than second heat face 214, a flow pattern of the heat or heated air may be directed chiefly toward a center of appliance 100 (e.g., cabinet 102). As mentioned above, a cooking fan (e.g., cooling fan 204) may then blow or suck the heat or heated air along a cooling path to an external area of appliance 100. However, in some instances, second length L2 of second heat face 214 may be longer than first length L1 of first heat face 212 (e.g., according to specific embodiments).

Figure 7:
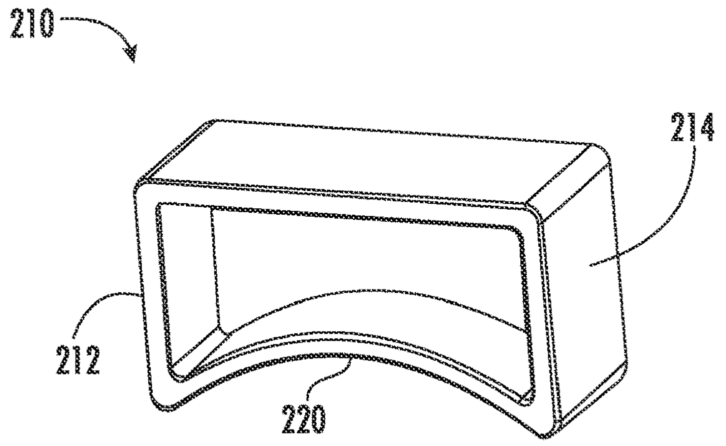
FIG. 7 provides a closeup perspective view of a bumper according to exemplary embodiments of the present disclosure.
Figure 8:
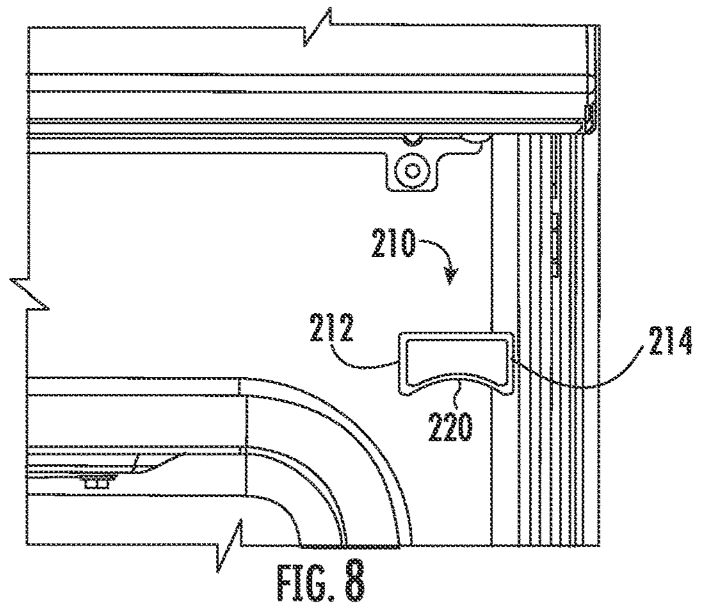
FIG. 8 provides a closeup front view of the exemplary bumper of FIG. 7.

Referring now to FIGS. 7 and 8, another embodiment of bumper 210 is provided. As shown, first heat face 212 and second heat face 214 may be predominantly parallel with each other. For instance, first heat face 212 and second heat face 214 may extend predominantly along the vertical direction V. Bumper 210 may include a convex face 220. Convex face 220 may be convex upward along the vertical direction V. For instance, a midpoint of convex face 220 may be positioned higher along the vertical direction V than either end point of convex face 220. Thus, convex face 220 may form a "C" shape downward along the vertical direction V. Convex face 220 may connect first heat face 212 to second heat face 214. For instance, convex face 220 may form a bottom of bumper 210 while first heat face 212 forms a first lateral side and second heat face 214 forms a second lateral side of bumper 212. Thus, convex face 220 may be positioned between first heat face 212 and second heat face 214 along the lateral direction L. Advantageously, the heat or heated air rising along front face 103 may collect along convex face 220. The heat or heated air may thus be impeded from rising along front face 103, thus dissipating heat before the air is expelled from cabinet.

Figure 9:
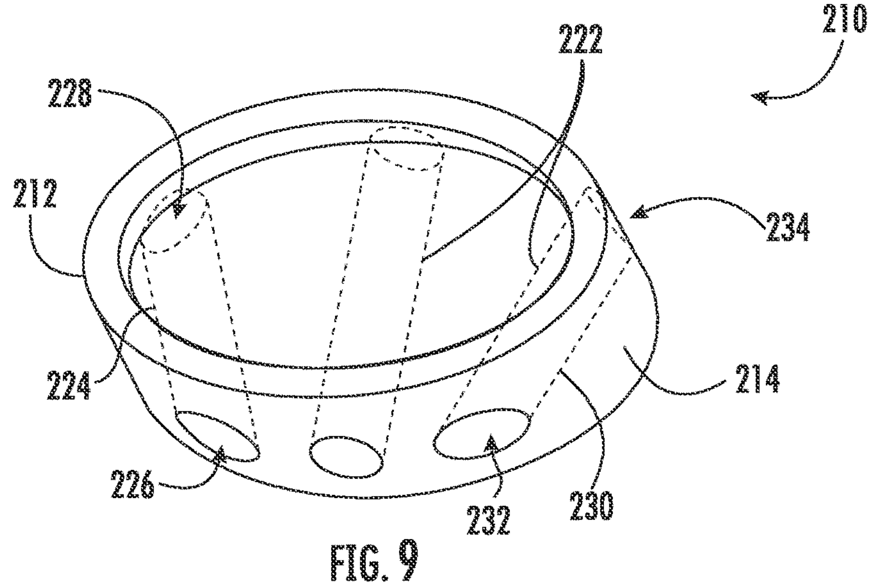
FIG. 9 provides a closeup perspective view of a bumper according to exemplary embodiments of the present disclosure.
Figure 10:
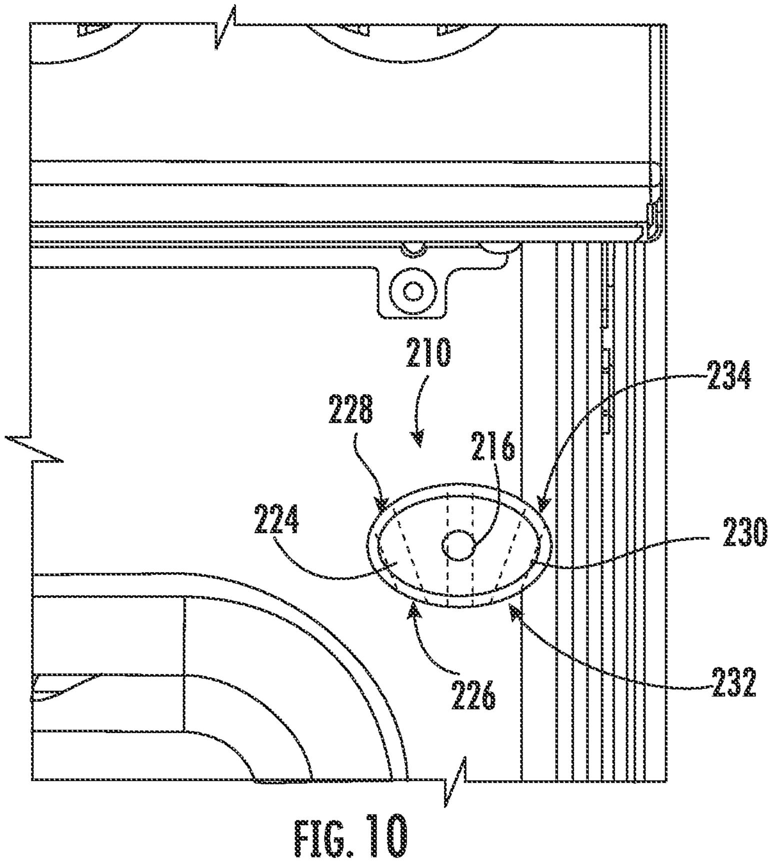
FIG. 10 provides a closeup front view of the exemplary bumper of FIG. 9.

Referring now to FIGS. 9 and 10, another embodiment of bumper 210 is provided. Although bumper 210 is shown as oval in shape, any suitable shape may be used. For instance, according to this embodiment, bumper 210 may be triangular, square, rectangular, circular, or any suitable geometric shape, and the disclosure is not limited to the examples provided herein. Bumper 210 may include a plurality of through holes 222. In detail, the plurality of through holes 222 may be formed predominantly along the vertical direction V (e.g., through bumper 210). Each of the plurality of through holes 222 may extend through bumper 210 (e.g., from a bottom through a top thereof). Accordingly, the heat or heated air may flow through the plurality of through holes 222 (e.g., from the bottom thereof through the top thereof). Although three through holes 222 are shown, it should be understood that any suitable number of through holes 222 may be incorporated, and the disclosure is not limited to the examples provided herein.

The plurality of through holes 222 may include a first through hole 224. First through hole may extend through bumper 210 at an acute angle with respect to the vertical direction V. For instance, an inlet (or bottom) 226 of first through hole 224 may be positioned at a first lateral location of bumper 210. An outlet (or top) 228 of first through hole 224 may be positioned at a second lateral location of bumper 210. The first lateral location may be laterally outward from the second lateral location. Thus, inlet 226 may be laterally outward from outlet 228. Advantageously, the heat or heated air flowing through first through hole 224 may be directed in a predetermined direction (e.g., toward a center of cabinet 102).

The plurality of through holes 222 may include a second through hole 230. Second through holes may be positioned opposite first through hole 224 (e.g., along the lateral direction L). Second through holes 230 may extend through bumper 210 at an acute angle with respect to the vertical direction V. For instance, an inlet (or bottom) 232 of second through hole 230 may be positioned at a first lateral location of bumper 210. An outlet (or top) 234 of second through hole 230 may be positioned at a second lateral location of bumper 210. The first lateral location may be laterally inward from the second lateral location. Thus, inlet 232 may be laterally inward from outlet 234. Advantageously, the heat or heated air flowing through second through hole 230 may be directed in a predetermined direction (e.g., toward a lateral edge of cabinet 102).

Figure 11:
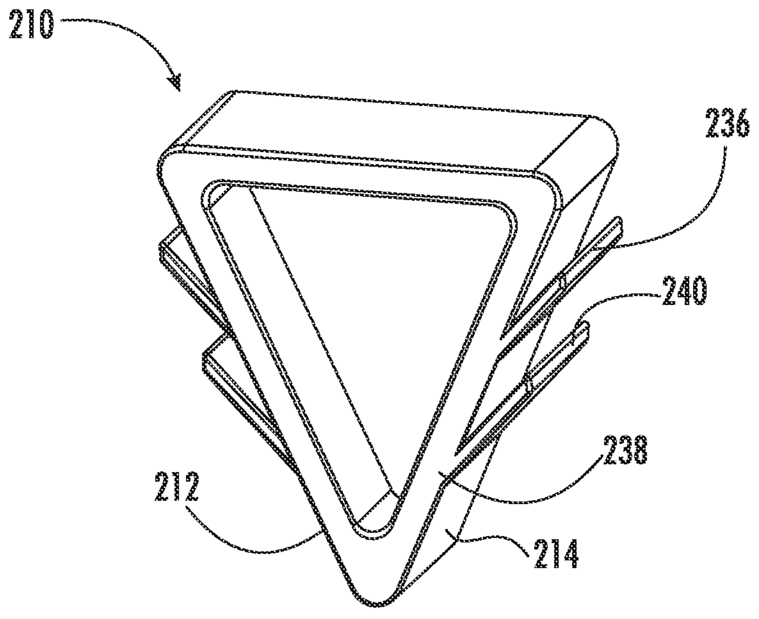
FIG. 11 provides a closeup perspective view of a bumper according to exemplary embodiments of the present disclosure.
Figure 12:
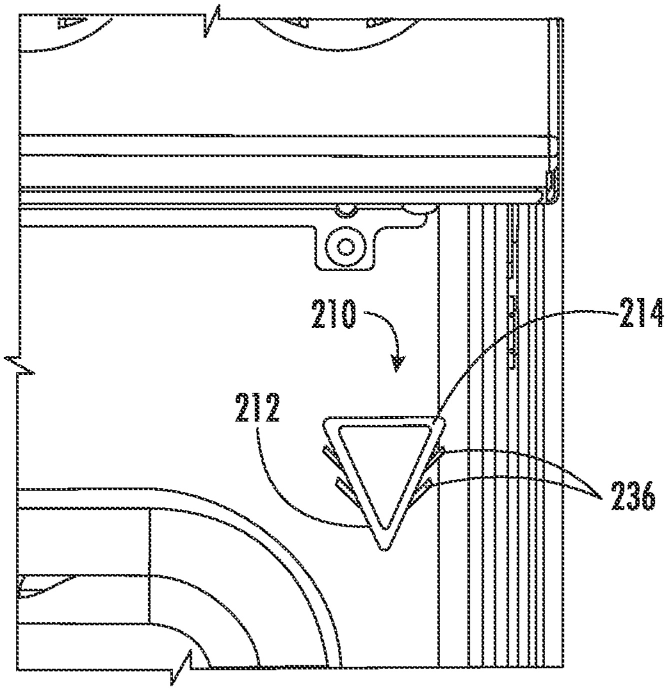
FIG. 12 provides a closeup front view of the exemplary bumper of FIG. 11.

Referring now to FIGS. 11 and 12, another embodiments of bumper 210 is provided. As shown, bumper 210 may include first heat face 212 and second heat face 214. Similar to the embodiment described above, first heat face 212 and second heat face 214 may conjoin at a bottom of bumper 210. Although shown as generally triangular in shape, it should be understood that bumper 210 may have any suitable geometric shape as described above. Bumper 210 may include a plurality of wings 236. The plurality of wings 236 may extend or protrude from one or both of first heat face 212 and second heat face 214. Although four wings 236 are shown, it should be understood that any suitable number of wings may be incorporated as specific implementations dictate or warrant. Hereinafter, a single wing 236 will be described in detail with the understanding that the description may apply to each of the plurality of wings 236.

As mentioned, wing 236 may extend from first heat face 212 or second heat face 214. Wing (or fin) 236 may extend generally upward (e.g., along the vertical direction V) and outward (e.g., along the lateral direction L) from first heat face 212 or second heat face 214. For instance, wing 236 may define a proximal end 238 and a distal end 240. Proximal end 238 may be connected with bumper 210 (e.g., first heat face 212 or second heat face 214). Distal end 240 may thus be positioned higher (along the vertical direction V) than proximal end 238. Additionally or alternatively, distal end 240 may be positioned laterally outward from proximal end 238. Advantageously, the heat or heated air may be directed by wing 238 upward (e.g., vertically) and outward (e.g., laterally) from bumper 210.

According to some embodiments, bumper 210 may include each of the plurality of through holes 222, the first heat face 212 and the second heat face 214, the plurality of wings 238, and the like. For instance, bumper 210 may define a particular geometric shape (e.g., rectangular, triangular, quadrangular, etc.) with the plurality of through holes 222 defined therethrough. The plurality of wings 238 may additionally protrude from one or more faces (e.g., first heat face 212, second heat face 214, etc.). Advantageously, a plurality of heat dispensing elements may be included in a single bumper 210, improving heat dissipation while eliminating the need for additional parts.

Figure 13:
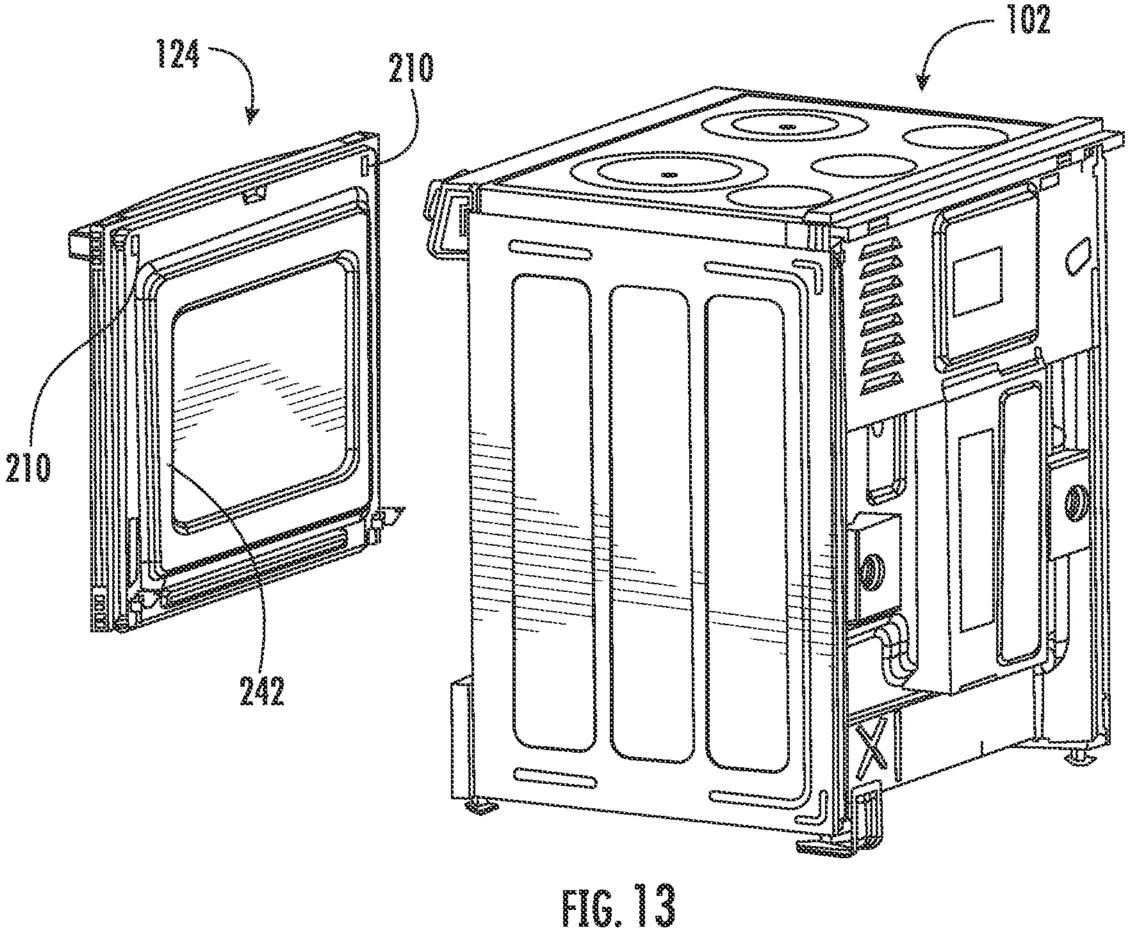
FIG. 13 provides a rear perspective view of the exemplary cooking appliance of FIG. 1 with the door removed.

Referring now to FIG. 13, oven appliance 100 is shown from a rear perspective view with door 124 detached therefrom. As mentioned above, bumper 210 may be attached to door 124. For instance, door 124 may include a rear panel 242. Rear panel 242 may face front face 103 of cabinet 102 when door 124 is in the closed position. Thus, bumper 210 may be attached to rear panel 242 of door 124. Two or more bumpers 210 may be attached to rear panel 242. For instance, a first bumper 210 may be positioned at a first lateral side of rear panel 242 and a second bumper 210 may be positioned at a second lateral side of rear panel 242. Any suitable number of bumpers 210 may be included however, and the disclosure is not limited to the examples provided herein.

Bumpers 210 may be attached to each of rear panel 242 of door 124 and front face 103 of cabinet 102. In some instances, a first bumper 210 attached to door rear panel 242 is offset from a second bumper 210 attached to front face 103. For instance, the first bumper (attached to the door) is vertically offset from the second bumper (attached to the cabinet). However, the bumpers 210 may be offset laterally in addition to or alternatively from vertically.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical direction, a lateral direction, and a transverse direction, the oven appliance comprising:

a cabinet forming a cooking chamber;

at least one heating element positioned within the cooking chamber;

a door rotatably coupled to the cabinet between an open position and a closed position; and a bumper protruding along the transverse direction and positioned between the cabinet and the door, the bumper configured to provide dampening between the cabinet and the door in the closed position, wherein the bumper comprises a first heat face and a second heat face, wherein the first heat face is configured to guide heated air along the lateral direction away from the second heat face, and wherein each of the first heat face and the second heat face is linear.

2. The oven appliance of claim 1, wherein the bumper is attached to a front wall of the cabinet.

3. The oven appliance of claim 2, wherein the cabinet comprises an attachment aperture into which the bumper is accepted, the attachment aperture comprising a clocking pattern to restrict rotation of the bumper with respect to the front wall.

4. The oven appliance of claim 2, wherein the bumper comprises an alignment tab, and wherein the cabinet comprises an alignment aperture to selectively receive the alignment tab.

5. The oven appliance of claim 1, wherein the bumper is attached to a rear panel of the door.

6. The oven appliance of claim 1, wherein the bumper further comprises a convex face convex upward to restrict heated air along the vertical direction, the convex face being positioned between the first heat face and the second heat face along the lateral direction.

7. The oven appliance of claim 1, wherein the bumper comprises a plurality of through holes formed predominantly along the vertical direction through the bumper.

8. The oven appliance of claim 7, wherein a first through hole of the plurality of through holes extends at an angle through the bumper such that an inlet of the first through hole is positioned laterally outward from an outlet of the first through hole.

9. The oven appliance of claim 1, wherein the bumper comprises a plurality of wings extending upward along the vertical direction and outward along the lateral direction from at least one of the first heat face or the second heat face.

10. A domestic appliance defining a vertical direction, a lateral direction, and a transverse direction, the domestic appliance comprising:

a cabinet forming a receiving chamber;

a door rotatably coupled to the cabinet to provide selective access to the receiving chamber; and a resilient bumper protruding along the transverse direction and positioned between the cabinet and the door, the resilient bumper configured to provide dampening between the cabinet and the door when the door is moved to a closed position, wherein the resilient bumper is located laterally offset from a centerline of the receiving chamber, wherein the resilient bumper comprises a first face and a second face to guide air along the lateral direction, and wherein each of the first face and the second face is linear.

11. The domestic appliance of claim 10, wherein the resilient bumper is attached to a front wall of the cabinet.

12. The domestic appliance of claim 11, wherein the cabinet comprises an attachment aperture into which the resilient bumper is accepted, the attachment aperture comprising a clocking pattern to restrict rotation of the resilient bumper with respect to the front wall.

13. The domestic appliance of claim 11, wherein the resilient bumper comprises an alignment tab, and wherein the cabinet comprises an alignment aperture to selectively receive the alignment tab.

14. The domestic appliance of claim 10, wherein the resilient bumper is attached to a rear panel of the door.

15. The domestic appliance of claim 10, wherein the resilient bumper further comprises a convex face convex upward to restrict air along the vertical direction, the convex face being positioned between the first face and the second face along the lateral direction.

16. The domestic appliance of claim 10, wherein the resilient bumper comprises a plurality of through holes formed predominantly along the vertical direction through the resilient bumper.

17. The domestic appliance of claim 16, wherein a first through hole of the plurality of through holes extends at an angle through the resilient bumper such that an inlet of the first through hole is positioned laterally outward from an outlet of the first through hole.

18. The domestic appliance of claim 10, wherein the resilient bumper comprises a plurality of wings extending upward along the vertical direction and outward along the lateral direction from at least one of the first face or the second face.

* * * * *